July 6, 1948.

B. O. KELSO 2,444,451

FLUID COUPLING

Filed Oct. 18, 1945

Inventor.
Beecher Olew Kelso
Rowland V. Patrick
By,
Attorney.

July 6, 1948.
B. O. KELSO
2,444,451
FLUID COUPLING
Filed Oct. 18, 1945
2 Sheets-Sheet 2
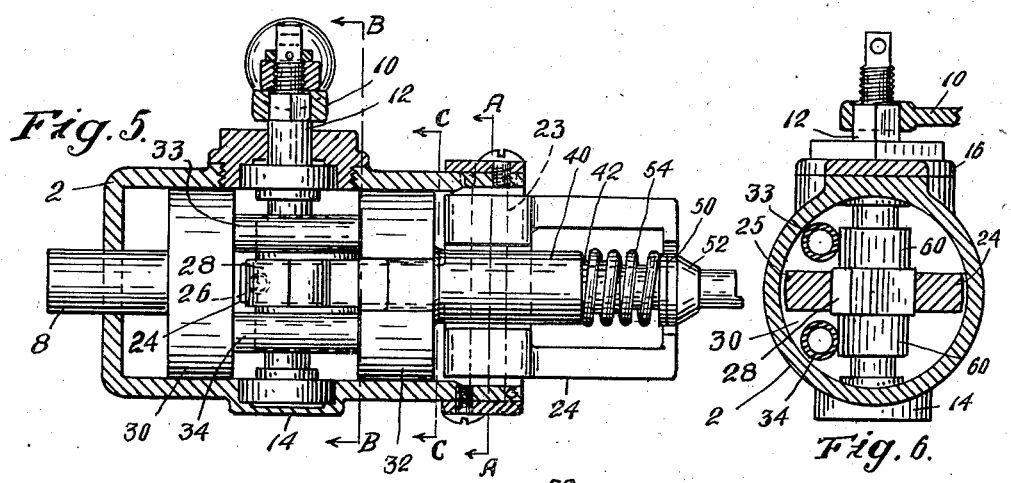
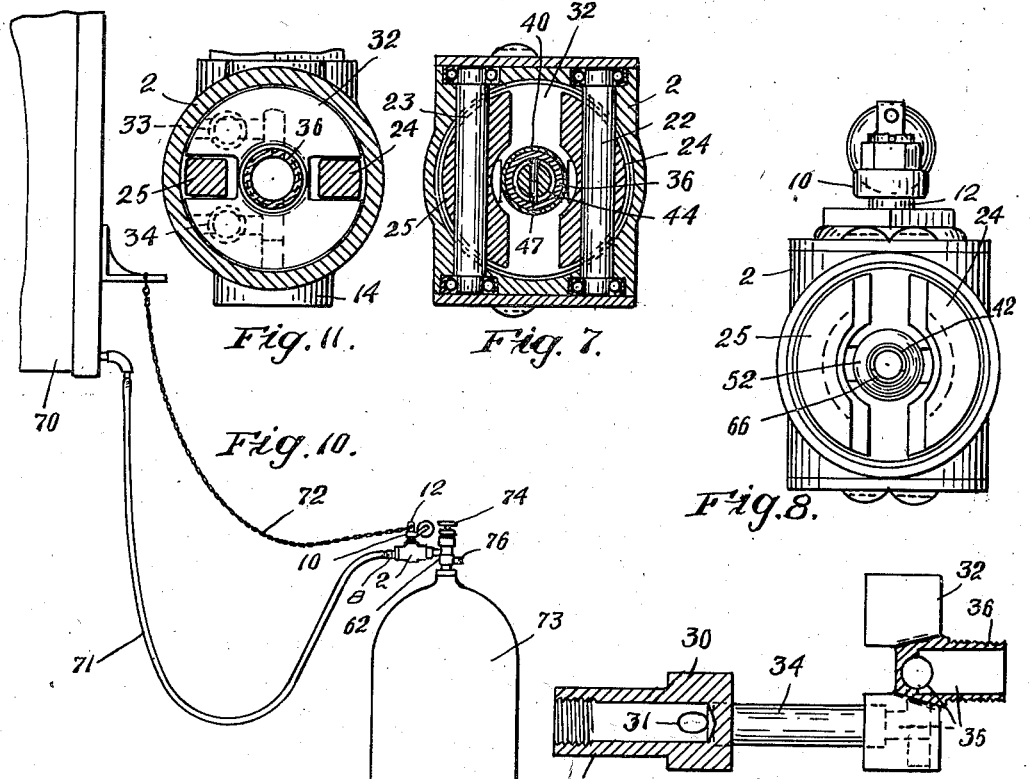
Inventor.
Beecher Olen Kelso
by Rowland J. Patuck
Attorney.

Patented July 6, 1948

2,444,451

UNITED STATES PATENT OFFICE 2,444,451

FLUID COUPLING

Beecher Olen Kelso, Portland, Maine, assignor to Utilities Distributors, Inc., Portland, Maine, a corporation of Maine Application October 18, 1945, Serial No. 623,138

11 Claims. (Cl. 284—18)

This invention relates to fluid couplings and particularly to couplings for connecting supply sources of fluid under pressure to empty cylinders or tanks, of the type commercially used for transporting and merchandising gases, to enable the cylinders to be expeditiously and economically filled and refilled with their designed capacity of gas under pressure, or conversely for connecting relatively low pressure outlet lines to such cylinders or other tanks as high pressure sources.

Fluid cylinders or tanks, for instance those utilized in merchandising domestic and commercial gases, are conventionally provided with closure valves and a common inlet-outlet nipple. Equipment required in the operation of filling such cylinders from a feed line source of gas under pressure includes a valve for the feed line and a coupling for connecting the feed line to the cylinder nipple with a fluid-tight seal. The operation itself, as heretofore practiced, requires the steps of (1) coupling the feed line to the cylinder nipple, as by screwing, to attain a fluid-tight coupling, (2) opening the cylinder valve, (3) opening the feed line valve, (4) closing the feed line valve, (5) closing the cylinder valve, (6) uncoupling the feed line. These are all hand operations and are time-consuming. The same multiple steps are required for connecting an outlet line to the filled cylinder.

It is a primary object of this invention to provide a fluid coupling which will reduce the time and labor involved in securing suitable pressure-tight coupling and in valve manipulation, particularly by the provision of apparatus which combines two or more of the above operations into a simple, single, continuous manual operation.

It is a further object of the invention to provide a fluid coupling which contains as a unit a coupling collet, a pressure-tight sealing member and a valve which, in the preferred form, are actuated in succession by a continuous motion of an operating handle so that the coupling may be permanently connected to a flexible feed or outlet line and the steps of sealing the coupling to the nipple of a cylinder and opening the supply or outlet line valve are preformed in rapid succession by one motion of the operating handle. After performance of these steps, the cylinder valve is opened, the cylinder filled, or emptied, as the case may be, the cylinder valve closed, and the closing of the feed or outlet line valve and unseating and loosening of the coupling from the cylinder nipple are then accomplished by a single return motion of the operating handle.

A further advantageous feature of couplings embodying the present invention is that loss of gas during the uncoupling operation is minimized by reason of the close proximity, in coupled position, of the feed or outlet line valve and the cylinder valve.

A fluid coupling embodying the invention hereof is shown in the accompanying drawings, wherein:

Fig. 5 is a longitudinal vertical sectional view of the device shown in Fig. 1;

Fig. 6 is a transverse sectional view taken along the line B—B of Fig. 5, but with certain top parts omitted;

Fig. 7 is a transverse sectional view taken along the line A—A of Fig. 5;

Fig. 8 is a front elevation of the coupling shown in Fig. 1;

Fig. 9 is a detail of an operating part of the device;

Fig. 10 is a diagrammatical illustration of one mode of utilizing the coupling in the operation of filling a gas cylinder; and Fig. 11 is a transverse sectional view taken along the line C—C of Fig. 5, but with its top broken away.

Figure 1:
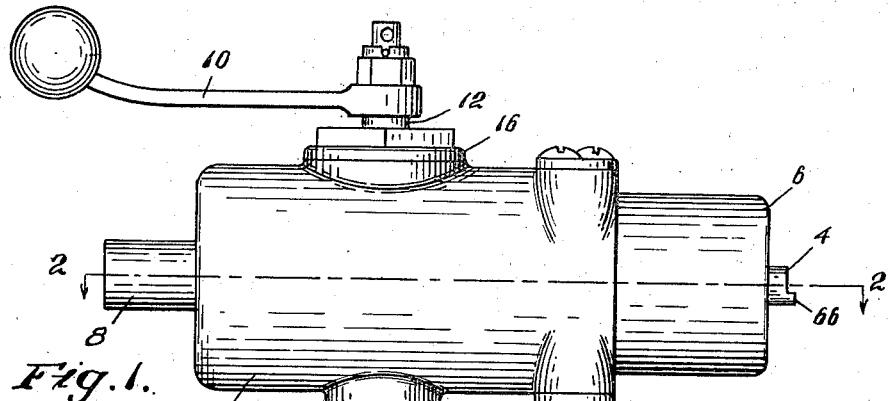
Fig. 1 is a side elevation of the coupling with the parts thereof in normal uncoupled position.

The coupling shown in the drawing comprises a housing 2 having an axially centered hollow valve stem 4 extending from its front face, at the right as shown in Fig. 1, the valve stem 4 being surrounded by a collet 6.

Extending through the rear of the housing 2 is an axially offset connection 8 to the coupling and an operating handle 10 is positioned on top of the housing for operating a control shaft 12 which extends through the housing and is journalled inside lower and upper housing bosses 14 and 16, respectively.

Figure 2:
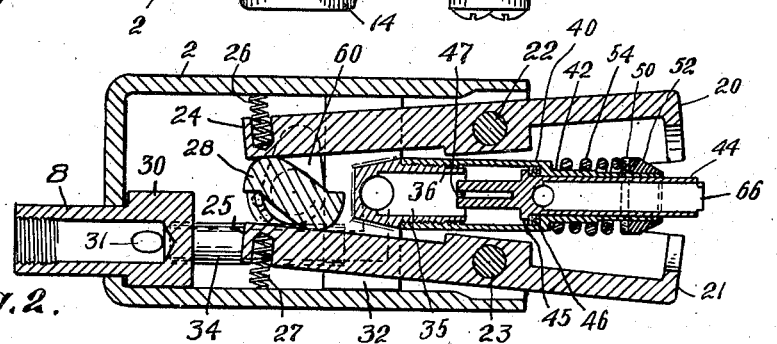
Fig. 2 is a horizontal sectional view along the line 2—2 of Fig. 1.

The collet comprises two substantially semicircular jaws 20 and 21 mounted in housing 2 for oscillation on trunnion-like pins 22 and 23, respectively. Inner portions 24 and 25 of the jaws 20 and 21 extend well into the housing 2, as shown in Fig. 2. The outer sides of inner end portions 24 and 25 are drilled to form seats for springs 26 and 27 which bear against the inner sides of housing 2 and tend to urge the inner end portions 24 and 25 of jaws 20 and 21 towards each other and against a two-lobe cam 28 fixedly mounted on control shaft 12. As shown in Fig. 7, pins 22 and 23 may, if desired, be journalled in ball bearings seated in upper and lower pairs of recesses in the housing 2, externally covered by screw held cover plates as shown.

As shown in Figs. 2 and 9, connection 8 leads to conduit members which collectively form a sliding valve assembly which is arranged for sliding movement longitudinally with respect to the housing 2 and collet 4. The sliding assembly includes a rear guide 30 and a forward guide 32, as shown in Fig. 5, each of these guides being shaped to bear against the inner surface of the cylindrical housing 2, forward guide 32 being recessed at the sides to span the rearwardly extending collet jaw portions 24 and 25.

The rear guide 30 has a vertical conduit 31 (Fig. 2) which leads upwardly to a pipe 33 and downwardly to a pipe 34 (Figs. 5 and 11), the pipes 33 and 34 connecting the rear guide 30 with the forward guide 32. This splitting of the conduit into two feed lines 33 and 34 permits cam 28 to operate therebetween against member 25 of the collet, as shown in Figs. 5 and 6.

Forward valve assembly guide 32 has conduits 35 which connect pipes 33 and 34 to a common forward axially centered outlet 36, as shown in Fig. 9. Screw-threaded on and extending forwardly from the outlet 36 is an axially centered valve assembly including a valve housing 40 which includes sleeve-like extension 42 of diminished diameter. Mounted in extension 42 for sliding movement is the hollow T-valve stem 44 which has, within the housing 40, an annular flange 45 which seats itself against an annular sealing surface 46 abutting the annular wall between housing 40 and extension 42. The inner exposed area of the flange 45 is of sufficient area so that pressure contained within the valve housing 40 will continuously urge the valve stem member 44, when unobstructed, in an outward direction to seal flange 45 against surface 46 and thus seal the housing 40. Valve 45, 46 will therefore open only when stem 44 moves inwardly relative to housing 40 against the pressure of fluid in housing 40. In order to prevent rotation of valve stem 44, it extends inwardly beyond flange 45 with bifurcated contour, surrounding a vertical guide pin 47 fixed across outlet 36 and relative to which pin 47, the valve stem may slide.

Loosely mounted around the extension 42 for sliding movement relative thereto, is an annulus 50 and a tapered resilient seal 52. Seal 52 is held against outward movement by any suitable means (not shown), and a compression spring 54 is provided between annulus 50 and the annular wall portion of housing 40.

Figure 3:
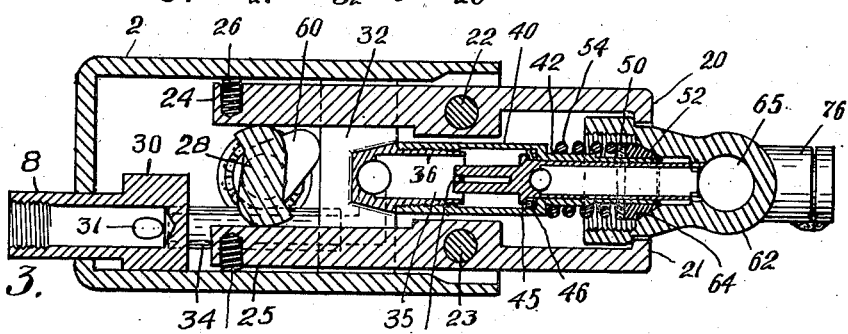
Fig. 3 is a horizontal sectional view wherein certain parts of the device have been moved with relation to other parts of the device by operation of the operating handle to establish initial coupling contact with a cylinder nipple.
Figure 4:
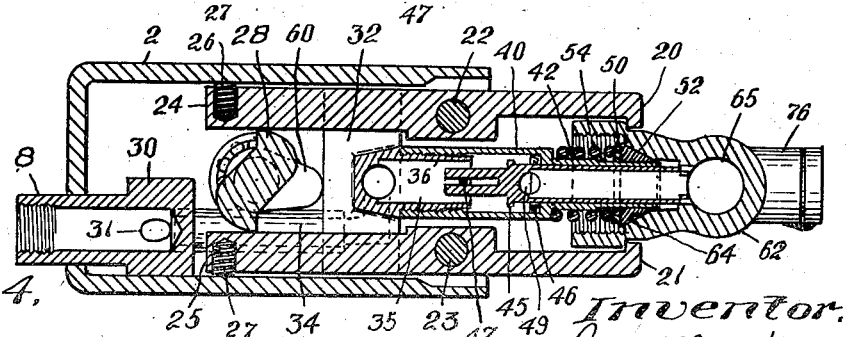
Fig. 4 is a further horizontal sectional view, similar to that shown in Figs. 2 and 3, but showing certain parts of the device in final coupled connection with a cylinder nipple.

In order to actuate the sliding valve assembly with respect to the housing 2 and collet 6, the control shaft 12 carries, in addition to the central collet operating cam 28, duplicate upper and lower operating cams 60. As shown in Figs. 2, 3 and 4, these cams bear against upper and lower rear surfaces of forward valve assembly guide member 32, and movement of control shaft 12 by handle 10, results in successive operation of the collet 6 and valve assembly as will now be described.

Assuming that the control handle is in the position shown in Fig. 1, cams 28 and 60 will be in the positions shown in Fig. 2, the cam 60 bearing on its low side against the guide 32 and the duplicate lobes of cam 28 bearing on their low sides against the inner end portions 24 and 25, respectively of the collet jaws. When the operating handle is moved to rotate control shaft 12 in a clockwise direction, as shown in Figs. 3 and 4, initial movement will result in cam 28 closing the collet 6, for instance gripping a nipple 62 of a cylinder. During this initial movement, the cams 60, as shown in Fig. 3, also start to bear against guide 32 of the conduit and valve assembly to move the latter to the right as shown in Fig. 3 relative to the housing 2 and jaws 20 and 21, until the sealing surface 52 abuts a cooperating tapered sealing seat 64 formed in nipple 62 a predetermined distance outwardly from the wall of the cylinder chamber port 65. In this position of Fig. 3, the valve stem flange 45 has been carried forward with and remains seated against the sealing surface 46. Further rotation of control shaft 12 to the position shown in Fig. 4, however, results in continued movement of the conduit and valve assembly to the right relative to the housing against the opposition of surface 64 bearing against sealing surface 52, the housing 40 acting to compress spring 54 to render the seal fluid-tight. With such continued movement the outer end of valve stem 44 is prevented from further movement relative to nipple 62 by reason of engagement of its lower shelf portion 66 with a cooperating abutment, such as the upper end portion of the wall of cylinder port 65, and hence the seal between surfaces 45 and 46 is broken by continued movement of the surface 46 away from flange 45 to the position shown in Fig. 4 so that port 49 leading to the hollow interior portion of valve stem 44 is placed in communication with the internal chamber of housing 40 thereby permitting flow of a supply of fluid under pressure, in the case of a filling operation, from the connection 8 as an inlet through the conduits 31, 33, 34, 35, 36, port 49 and hollow valve stem 44 to the nipple. Upon opening the cylinder valve to open the port 65, communication will thus be established between inlet 8 and the inner chamber of the cylinder. To uncouple the coupling after the filling operation is completed, the cylinder valve is closed and handle 10 is then moved from the position shown in Fig. 10 to its initial position of Fig. 1. During this movement, spring 54 will move housing 40 to the rear carrying stem 44 out of engagement with the cylinder port abutment and closing valve surfaces 45 and 46 under the pressure of fluid in housing 40, and the collet jaws will move outwardly from nipple 62 and permit the coupling to be freed of the nipple. The fluid conduit and valve assembly, with the coupling valve closed, may then be returned to the initial position of Fig. 1 in readiness for coupling to another nipple.

It will be understood that, for designed operation, the elements 40, 44 and 52 of the sliding valve assembly should be so proportioned that the normal distance between a plane passing through an outside circumference of coupling sealing surface 52 at a given diameter, and the end surface of valve stem 44 lip extension 66 will be somewhat less than the fixed distance between a plane, passing through an inside circumference of nipple sealing surface 64 at the same given diameter, and abutment wall of port 65, so that surface 52 will contact surface 64 before extension 66 engages the abutment wall of port 65. This will insure a fluid-tight connection with the nipple before the coupling valve opens. Stated somewhat non-technically, the normal distance between surface 52 and the end of lip 66 should be less than the fixed distance between cooperating surface 64 and abutment wall of port 65 of the nipple 62.

Fig. 10 is a diagrammatic illustration of how the coupling of this invention may be connected with a source of gas supply under pressure 70 to permit rapid filling of cylinders such as 73. In Fig. 10, a flexible feed line 71 leads from supply 70 to inlet connection 8 of a coupling. The coupling may be suspended as by chain 72 in a position so that it may be readily moved towards a nipple 62, properly shaped as hereinbefore described, inserted in the head of cylinder 73. The cylinder valve is operated by a hand wheel 74 to open and close communication between nipple 62 and the internal chamber of the cylinder. 76 illustrates a conventional safety valve on the cylinder.

As will be understood, such an apparatus, during the operation of coupling, combines in substantially one operation the manual steps of sealing the feed line to the nipple and opening the feed line valve; while, in the operation of uncoupling, it combines in substantially one operation the unsealing and closing of the feed line valve and freeing of the coupling from the nipple. Multiple filling operations can therefore proceed rapidly. Furthermore, during the uncoupling operation, the only gas lost is that small volume which is contained in the hollow valve stem between port 49 and the cylinder valve 74. Filling operations utilizing the coupling of the invention therefore have substantial advantages over prior known filling operations.

While the description hereinbefore given is for the most part concerned with a filling operation, it should be recognized that couplings of this invention are equally adapted for unloading operations. For example, for unloading railway tank cars or vehicular trucks, the coupling of this invention may be affixed to an inlet line of the storage tank and, after connection to the railway or truck tank, permits filling of the storage tank by impressing upon the tank or truck load a pressure higher than that in the storage tank, as with a pump. In other words, while a filling operation has been described as a specific example of an advantageous use of the coupling of this invention, no limitation is meant to be imposed upon the use of the coupling, which, regardless of use, is intended to be broadly covered as a structure, as defined in the appended claims.

I claim:

1. A detachable valve coupling unit comprising a housing, means mounted on said housing for detachably gripping an inlet nipple, a fluid conduit defining member movable with respect to said housing, a sealing element carried by said conduit member and movable between retracted and extended positions thereon, means yieldably supporting said conduit member in its extended position, a valve in said conduit arranged to be actuated by movement of said sealing element toward its retracted position to open the valve, a manual control element movable from an off to an on position, a connection rendered operative by a first portion of said movement to actuate said gripping means, and an additional connection rendered operative by the continued movement of said manual control element for moving said conduit member to a position extended relative to said housing to move said sealing element to a position adapted to cooperate yieldably with a sealing seat on said nipple to form a pressure-tight seal and to open the valve.

2. A detachable valve coupling unit comprising a housing, means mounted on said housing for detachably gripping an inlet nipple, a fluid conduit defining member movable with respect to said housing and said gripping means, a sealing surface carried by said conduit member but yieldably movable inwardly relative thereto, a valve in said conduit, a terminal valve stem associated with said conduit member and extending therebeyond but adapted with inward motion relative to said conduit member to open said valve against the pressure of fluid in said conduit and means for successively moving said gripping means and said conduit member first to cause said gripping means to grip an inlet nipple and then to move said conduit member to extended position relative to said housing against obstruction to free movement of said sealing surface and valve stem.

3. A valve coupling unit adapted for coupling with an inlet nipple, comprising a housing, a fluid conduit defining member movable with respect to said housing, one end of said conduit member being adapted for connection to a source of fluid under pressure, a valve in said conduit normally closed when said conduit member is thus connected, a terminal valve stem associated with the other end of said conduit member and extending therebeyond but adapted with inward motion relative to said conduit member to open said valve against the pressure of fluid in said conduit, a sealing surface circumscribing said terminal valve stem and yieldably movable inwardly relative to said conduit, a collet having jaws extending externally of said conduit member pivotally mounted on said housing for pivotal movement towards and away from each other, and means for successively pivoting said collet jaws to relative positions adapted to grip an inlet nipple and for moving said conduit member to extended position relative to said housing and collet against obstruction to movement of said sealing surface and valve stem.

4. A valve coupling unit adapted for coupling with an inlet nipple, comprising a housing, a fluid conduit defining member movable with respect to said housing, one end of said conduit member being adapted for connection to a source of fluid under pressure, a valve in said conduit normally closed when said conduit member is thus connected, a terminal valve stem associated with the other end of said conduit member and normally movable therewith and extending therebeyond but adapted with inward motion relative to said conduit member to open said valve against the pressure of fluid in said conduit, a sealing surface mounted on said conduit member around said terminal valve stem and also normally movable with said conduit member but yieldably movable inwardly relative to said conduit member independently of said valve stem, a collet having jaws extending externally of said conduit member and pivotally mounted on said housing for pivotal movement towards and away from each other, and means for successively pivoting said collet jaws to relative positions adapted to grip an inlet nipple and for moving said conduit member to extended position relative to said housing and collet against obstruction to movement of said sealing surface and valve stem with said conduit member.

5. A valve coupling unit as claimed in claim 4, wherein the pivoting and moving means includes a cam for pivoting the jaws of the collet and a cam for moving the conduit member relative to said housing.

6. A valve coupling unit as claimed in claim 4, wherein the pivoting and moving means includes a cam shaft journalled in the housing, a cam on said shaft for pivoting the jaws of the collet, and a cam on said shaft for moving the conduit member relative to the housing, said collet cam having a high lobe advanced on said control shaft with respect to the high lobe of said conduit member cam, whereby continuous rotation of said cam shaft causes movement of said collet jaws and said conduit member in rapid succession.

7. A valve coupling unit as claimed in claim 4, wherein the terminal valve stem associated with the conduit member is hollow and forms the outlet of said conduit and wherein the sealing surface circumscribes said hollow valve stem.

8. For use with an inlet nipple having a sealing seat and an abutment spaced inwardly of said nipple a predetermined distance from said seat, a detachable valve coupling unit comprising a housing, a fluid conduit defining member movable with respect to said housing, one end of said conduit member being adapted for connection to a source of fluid under pressure, a valve in said conduit normally closed when said conduit member is thus connected, a terminal valve stem associated with the other end of said conduit member and extending therebeyond but adapted with inward motion relative to said conduit member to open said valve against the pressure of fluid in said conduit, a sealing surface mounted around said terminal valve stem and spaced inwardly from the end of said stem a distance less than the distance between said nipple seat and nipple abutment, but being yieldably movable inwardly relative to said conduit independently of said valve stem, a collet having jaws pivotally mounted on said housing for pivotal movement towards and away from each other, and cam means for pivoting said collet jaws to relative positions adapted to grip said inlet nipple and for moving said conduit member to extended position relative to said housing and collet first to seat said sealing surface against said nipple seat to form a pressure-tight seal and then to carry said valve stem against said nipple abutment to open said valve.

9. A detachable valve-coupling unit having, in combination, a housing, gripping means carried by the housing for detachably gripping an inlet nipple, a fluid conduit defining member movable with respect to the housing and said gripping means, a valve in said conduit, an actuator carried by said conduit adapted to be moved with relation to the conduit by engagement with an obstruction provided by the inlet nipple to open the valve, and a manual control element carried by the housing shiftable from an off to an on position, and connections rendered operative by said shift to the on position first to actuate the gripping means and thereafter to advance the conduit defining member to open the valve.

10. A detachable valve-coupling unit having, in combination, a housing, gripping means carried by the housing operable to move into gripping engagement with the nipple to be coupled, a shut-off valve assembly shiftable in the housing toward the nipple to be coupled and including a valve opening element arranged to be engaged against the obstruction provided by the nipple to be coupled to open the valve, and a manually operable control comprising a manual control element shiftable from an off to an on position, a cam actuated by the first part of said movement to actuate the gripping means, and a cam rendered operative by the latter part of said movement to move the valve assembly toward the nipple to open the valve.

11. A detachable valve-coupling unit having, in combination, a housing, gripping means mounted on said housing for detachably gripping an inlet nipple, a fluid conduit defining member movable with respect to said housing and said gripping means, a valve in said conduit, a valve stem associated with said conduit member and extending therebeyond for engagement against an obstruction provided by the inlet nipple to be coupled to open the valve, a cam shaft journalled in the housing, an operating handle for moving said cam shaft from an off to an on position, a cam on said shaft rendered operative by a first portion of said shaft movement for actuating the gripping means, and a cam on said shaft rendered operative during the latter portion of said shaft movement for moving the conduit member relative to the housing.

BEECHER OLEN KELSO.

REFERENCES CITED

The following references are of record in the file of this patent:

UNITED STATES PATENTS

| Number | Name | Date |
| --- | --- | --- |
| 2,061,062 | Davis et al. | Nov. 17, 1936 |
| 2,369,356 | Koehn | Feb. 13, 1945 |